2,752,256
TIRE COATING LIQUID

Alexander H. Hargis, Yakima, Wash.

No Drawing. Application October 16, 1953,
Serial No. 386,651

3 Claims. (Cl. 106—36)

The present invention relates to a composition for coating vehicle tires to increase the tire traction as the vehicle travels over slippery surfaces.

The primary object of the invention is to provide a liquid tire coating to be sprayed or otherwise coated on motor vehicle tires to greatly increase the coefficient of friction between the tires and ice, snow covered or other slippery surface over which the tires are traveling.

Another object of the invention is the provision of a composition to be applied as a tire coating that exists as a low viscosity liquid enabling the same to be sprayed or brushed or poured on the vehicle tire surface as desired, which composition is extremely inexpensive to produce and which composition adheres for long periods of time to the tire surface.

A composition comprising the present invention consists essentially of four basic ingredients in the following proportions by volume:

|  | Percent |
|---|---|
| Methyl alcohol | 25 |
| Sodium hypochlorite | 7 |
| Sodium chloride | .75 |
| Distilled water | 67.25 |

The proportions above may be slightly varied to meet weather conditions by increasing or decreasing the wood or methyl alcohol ±10% with a corresponding increase or decrease of like percentage in the distilled water. In other words, the wood alcohol may vary in the composition from 15–35% while the distilled water may vary from 57.25–77.25% depending upon the comparative atmospheric temperature variations.

The first three ingredients, namely the alcohol, hypochlorite and the salt all have the common property of lowering the freezing temperature of water in addition to being miscible and soluble in water.

Further, the wood alcohol serves to prepare the tire surface for application of the composition by performing an excellent cleaning operation on the tire surface.

The sodium hypochlorite when dissolved in the alcohol and water forms a tenacious film on the tire that is not easily rubbed off while the sodium chloride is utilized primarily for its capacity for additionally assisting and lowering the freezing temperature of the distilled water which constitutes the vehicle or carrier for the composition.

When the liquid composition is applied to a motor vehicle tire, tests show a great increase in the coefficient of friction between the tire and an ice or snow covered surface over which the tire is traveling.

The following tests were conducted on streets covered with compacted snow and ice to test the effectiveness of this liquid composition:

1. An automobile with plain, untreated tires was parked at a curb. It was unable to pull away from the curb when started due to excessive skidding. Application of the composition constituting the present invention to the tires enabled the car to pull away from the curb without maneuvering or skidding.

2. An automobile with untreated tires was pulled into a bank of snow created by a snowplow. The auto was allowed to roll into the snow bank by momentum. The automobile was unable to pull clear of the snow bank under its own power, even with maneuvering, due to excessive tire slippage. The tires of the automobile were then sprayed with the composition constituting the invention and the automobile pulled out from the snow bank under its own power without maneuvering and with minor slippage.

3. An automobile with untreated tires approached and started up a 30% grade. After the car had progressed approximately one-tenth of a mile up the grade, the forward momentum of the car ceased due to excessive tire slippage and the automobile was forced to back down the grade. Under the same conditions, the tires of the automobile were treated with the liquid composition and proceeded to the top of the grade without difficulty or slippage.

4. An automobile with sawdust applied to the tires was subjected to the same test as in Example 3. On a run from the bottom of the grade, the automobile was enabled to proceed to the top. But, when the automobile was stopped on the grade it could not again get under way to proceed up the grade. When this same automobile had its tires coated with the composition constituting the present invention, the automobile was not only enabled to proceed to the top of the hill, but was enabled to start and stop at will on the hill and still proceed to the top thereof.

5. On a comparison test, it was found that for any given speed an automobile having its tires treated with the present composition when the brakes were locked would stop in a third less distance than an automobile with untreated tires.

The successful utilization of the composition for increasing the coefficient of friction between the tires and the ice or snow covered surfaces is believed to be as follows. Initially, the alcohol and the salt water, by reason of their slight volatility permeate the snow covered surface beneath the tires and soften the compacted snow or ice which is rendered tacky by the additional action of the aqueous-alcohol film of sodium hypochlorite adhering to the tire greatly increasing the traction of the tire as it rolls with a consequent reduction in slipping or skidding of the tire.

From the foregoing, the composition and its utility are believed to be readily understood. However, since minor changes in proportions of the ingredients of the composition will readily occur to those skilled in the art, it is desired to limit the invention only as required by the scope of the appended claims.

What is claimed as new is as follows:

1. A liquid composition for coating vehicle tires to increase the traction thereof on ice and snow consisting of by volume, 15–35% of methyl alcohol, 7% sodium hypochlorite, .75% sodium chloride and 57.25–77.25% water.

2. A liquid composition for coating vehicle tires to increase the traction thereof on ice and snow consisting by volume of 15–35% of an alcohol selected from the group consisting of methyl and ethyl alcohol, approximately 7% sodium hypochlorite, approximately .75% sodium chloride, and over 50% water.

3. A liquid composition for coating vehicle tires to increase the traction thereof on ice and snow consisting by volume of 25% methyl alcohol, 7% sodium hypochlorite, .75% of sodium chloride, and 67.25% distilled water.

References Cited in the file of this patent

UNITED STATES PATENTS

| 1,603,122 | Krueger | Oct. 12, 1926 |
|---|---|---|
| 2,143,629 | Nadeau et al. | Jan. 10, 1939 |
| 2,204,466 | Barnes | June 11, 1940 |
| 2,582,701 | Iknayan | Jan. 15, 1952 |